Aug. 28, 1962 E. H. NIEMEYER 3,051,847

TRANSISTOR SWITCHING CIRCUIT WITH THERMISTOR BIASING MEANS

Filed March 15, 1957

United States Patent Office 3,051,847
Patented Aug. 28, 1962

3,051,847

TRANSISTOR SWITCHING CIRCUIT WITH THERMISTOR BIASING MEANS

Edward H. Niemeyer, Mount Rainier, Md., assignor to ACF Industries Incorporated, New York, N.Y., a corporation of New Jersey Filed Mar. 15, 1957, Ser. No. 646,426
3 Claims. (Cl. 307—88.5)

This invention relates broadly to switching devices and more particularly to a sub-miniature high current switching device which is resistant to shock and vibration.

In the development of electronic circuitry it is often necessary to develop a switching circuit capable of controlling high current contactors from low voltage differential information signals. For the most part the control of high current relays or contactors from low voltage control information signals requires the use of many stages of amplification and intermediate relay circuits.

The usual method of switching heavy currents by vacuum tube control is by means of an electromagnetic relay. Electromagnetic relays are heavy due to wire and core construction and relay contacts are subject to shock and vibration effects and are susceptible to erratic switching. The very size and mass of the relay is a limitation upon its application.

An object of the invention is to provide a sub-miniature high current switching apparatus.

A yet further object of the invention is to provide a switching device resistant to shock and vibration comprising a circuit having thermistor and transistor components.

Summarily stated, the invention comprises a transistor control circuit having a high current gain power transistor and a thermistor bias control unit. A positive bias is applied to hold the transistor at cut off condition. A control tube is triggered to apply a negative bias to cause transistor conduction. A thermistor in series with the control tube automatically compensates for the normal loss of cut off bias due to increased leakage that occurs in a transistor as junction temperature rises.

The invention will be more fully set forth in the following description referring to the accompanying drawings, and the features of novelty will be pointed out with particularity in the claims annexed to and forming a part of this specification.

In reference to the drawings in which like parts are designated by like numbers;

Because of the leakage characteristics of the semiconductor material the voltage requirements for holding a transistor at cut off change with temperature. As the temperature rises an increased impressed voltage, due to increased leakage, is required to keep the transistor biased to cut off. As will now be explained in detail this invention discloses a transistor switching circuit wherein the transistor temperature characteristics are automatically compensated.

Figure 1:
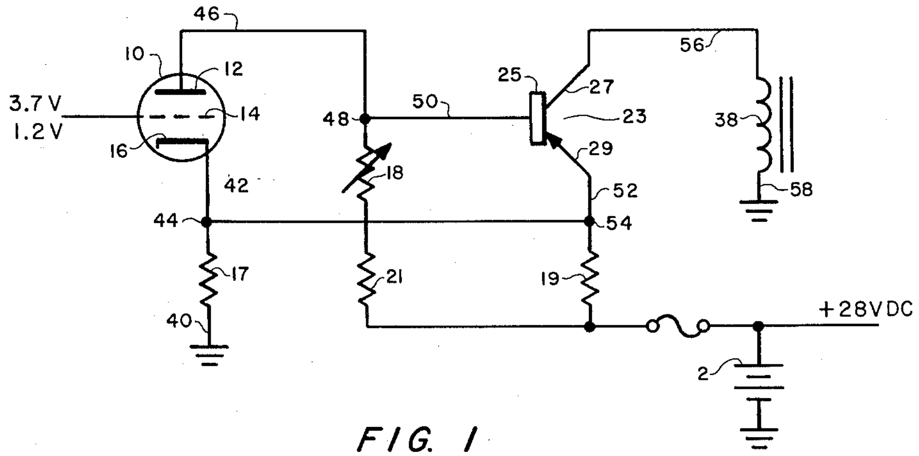
FIGURE 1 is schematic diagram of the thermistor compensated transistor switching circuit.

The circuit as shown in FIGURE 1 has a D.C. voltage source 2, a multielement discharge device 10, a thermistor 18, and a multielement semiconductor 23 in conjunction with biasing impedances 17, 19 and 21 to control the flow of current through load 38.

The D.C. voltage source 2 may be 28 volts although almost any value is acceptable if used with the proportionate parameters of elements 17, 19 and 21. The multielement discharge device 10 has at least a plate 12, a cathode 16 and control grid 14 although a multielement discharge apparatus having more elements may be adapted to operate as a triode device. The preferred embodiment utilizes a type 6111 electron discharge tube as the multielement discharge device 10. The thermistor 18 may be any one of several well known semi-conductor devices having a negative coefficient of resistance, a washer type (FIG. 3) thermistor lending itself well to this application. Multielement semiconductor 23 is a PNP type transistor having a base element 25, a collector element 27 and an emitter element 29. Impedances 17, 19 and 21 shown schematically as resistive elements are selected to be of such value as to bias the transistor 23 to a low or non-conductive condition.

The thermistor compensated transistor switching circuit controls the current through the load 38. Load 38 is schematically shown as a coil winding such as found in a heavy current contactor used for controlling other external circuitry. The invention however will satisfactorily control load currents of several amperes to contactor coil loads. This switching may be satisfactorily accomplished by the invention with a step voltage input variation of two and a half volts or less. This means that a 400 milliampere load current may be controlled by changing the voltage on the control grid 14 of discharge device 10 from 1.2 volts to 3.7 volts. The load 38 used with the circuit is not limited to a contactor coil, the selection of such a load being shown as one embodiment.

One side of bias impedance 17 as well as one side of the load 38 are shown connected to ground potential or the negative side of the D.C. potential source by connecting means 40 and 58. The device elements shown in FIGURE 1 are connected by conductors 42, 46, 50, 52 and 56, junctions between electrical conductors being designated as 44, 48 and 54.

Figure 3:
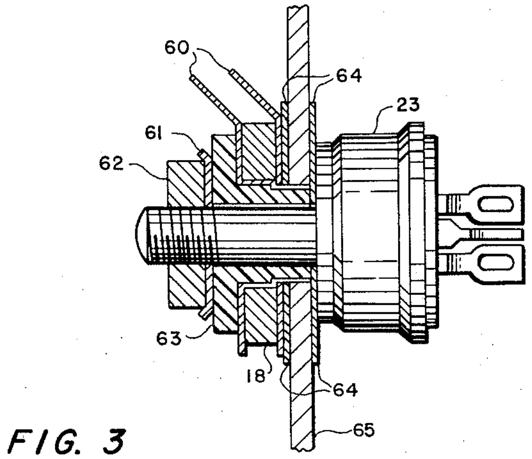
FIGURE 3 is a sectional view of the thermistor-transistor components mounted for use.

The thermistor and transistor may be mounted together as shown in FIGURE 3. The thermistor unit 18 is mounted coaxially and adjacent to the transistor such that thermal resistance is at a minimum. The combined units are mounted on a metal chassis which provides the heat sink conditions necessary for operation of power transistors. FIGURE 3 shows the transistor 23 isolated from a mounting plate 65 by means of a mica washer 64. Another mica washer 64 on the second side of the mounting plate isolates the plate from the washer type thermistor 18. A phenolic bushing 63 provides an insulated passage through the mounting plate for the shaft of the transistor 23 and lockwasher 61 and nut 62 are provided to secure the assembly of parts. The connection lugs of the thermistor 18 are designated by the number 60. The thermistor-transistor portion of the circuit may thus be mounted as a subminiature assembly.

*Operation*

In the invention, positive base bias is provided by connecting the base of the transistor 25 to the D.C. potential source 2 through the series thermistor-impedance arrangement 18–21 and connecting the emitter 29 through conductor 52 to the junction 54 of the series impedance combination of 17 and 19. The current flowing from the voltage source 2 through impedance 19, junction 54, junction 44, impedance 17 and connector 40 to ground creates a voltage drop across impedance 19 which reduces the voltage at the junction 54 and at emitter 29, thereby making the voltage level at the emitter less than at the base 25 and making the transistor non-conductive. In this condition little or no current will flow from the collector 27 to the load 38.

When external control means allows the potential of control grid 14, of device 10, to increase and thereby increase tube conduction the transistor conducts and the load is activated.

To examine this operation in more detail, it will be seen that the flow of current when the discharge device or tube is conducting is through impedance 21, thermistor 18, junction 48, connector 46 to plate 12, thence through the tube to ground. When the potential level of the control grid rises the plate current increases, increasing the voltage drop across the thermistor-resistor combination thereby reducing the voltage at junction 48. When the voltage at junction 48 and therefore at base 25 falls below the bias level applied to emitter 29, the transistor becomes conductive and allows a large current flow from the D.C. source 2, through impedance 19, junction 54, connector 52, from emitter 29 to collector 27 and there through connector 56 to the load 38 and back to the power source through connector 58.

Impedance 21 and thermistor 18 form a resistance having a negative temperature coefficient. The resistance of thermistor 18 decreases with increased transistor junction temperature. As junction temperature in a transistor rises, leakage increases and a loss of cut off bias is experienced. The thermistor provides a greater positive bias with increasing temperature thereby compensating for the transistor characteristic.

Figure 2:
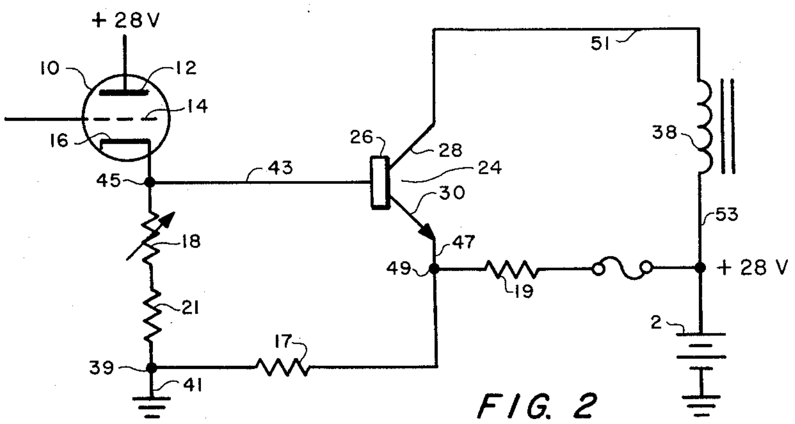
FIGURE 2 is a schematic diagram of an alternative construction of the thermistor-compensated transistor switching circuit.

An alternative construction of the invention is shown in FIGURE 2 wherein a NPN type transistor is used and the thermistor bias element is placed in the cathode circuit of the discharge device. The voltage developed at junction 49 due to the flow of current from the voltage source 2 through impedance 19, junction 49, impedance 17, junction 39, and conductor 41 produces a voltage at 49 and emitter 30 which is more positive than the potential at the base 26, therefore biasing transistor 24 to a non-conductive stage.

As the external control voltage applied to the grid 14 of the multielement discharge device 10 increases, current flow through the tube increases, thereby increasing the voltage potential at junction 45 and base 26. When the voltage at the base 26 exceeds the potential at the emitter 30, the transistor switches into a conductive state and current flows from the voltage source 2, through the conductor 53, through load 38, connector 51 to the collector 28 and thence to the emitter 30, connector 47, junction 49, impedance 17, junction 39, connector 41 to the negative side of the potential source. Thus by a small amount of voltage change at the grid of the discharge device, a switching of a large current through the load is accomplished.

As in the previously described embodiment, the thermistor-resistor series circuit has a negative temperature coefficient thereby automatically compensating for the bias loss of the transistor due to temperature rise.

In one successful embodiment of the invention a 6111 type electron tube was used with a 22W2 thermistor, a NPN Honeywell type H-6 transistor, a AN3352-1 50 ampere contactor load, the resistance 21 was 470 ohms, and resistors of ½ ohms and 200 ohms for impedances 17 and 19 respectively. A load current of 400 milliamperes was realized when the switching process occurred due to increasing the voltage at the control grid from 1.2 to 3.7 volts.

While the invention is here illustrated and described with respect to certain preferred embodiments thereof many changes may be made without departing from the generic spirit and scope of the invention as set forth herein and in the claims appended hereto.

I claim:

1. A transistor switching device comprising in combination a cathode follower circuit including a discharge device having a cathode, a grid and a plate, a transistor having an emitter, a base and a collector, a load connected directly to the collector, a source of direct voltage, a biasing circuit including an impedance connected between the source of voltage and the emitter to apply thereto a voltage less than source voltage, a second circuit comprising a thermistor and an impedance connected between the voltage source and the cathode, the cathode being connected directly to the base and a circuit connecting the plate to the positive side of the voltage source whereby a voltage signal to the grid produces current flow in the said second circuit to apply a positive voltage to the base and trigger transistor current flow to the load.

2. The invention as set forth in claim 1 wherein the thermistor circuit has a negative coefficient of temperature and compensates for normal transistor leakage bias loss.

3. A transistor switching device comprising in combination a multielectrode discharge device having an input grid and an output cathode electrode, a multielectrode transistor having input and output electrodes and a base electrode, a potential source, a biasing circuit comprising the series connection of an impedance and a thermistor, circuit means including said biasing circuit and said potential source connected to the output cathode of said discharge device, said cathode being connected to the base electrode of said transistor to normally bias the transistor to a nonconductive state, and a load connected to the output of said transistor whereby an input signal to the said discharge device produces current flow through the said biasing circuit to overcome the normal bias and produce transistor current to the said load.

References Cited in the file of this patent

UNITED STATES PATENTS

| | | |
|---|---|---|
| 2,757,243 | Thomas | July 31, 1956 |
| 2,761,916 | Barton | Sept. 4, 1956 |
| 2,762,875 | Fisher | Sept. 11, 1956 |
| 2,764,643 | Sultzer | Sept. 25, 1956 |
| 2,774,875 | Keonjan et al. | Dec. 18, 1956 |
| 2,788,449 | Bright | Apr. 9, 1957 |
| 2,801,298 | Mital | July 30, 1957 |
| 2,809,304 | Dickinson | Oct. 8, 1957 |
| 2,848,658 | Mitchell | Aug. 19, 1958 |
| 2,866,017 | Jones | Dec. 23, 1958 |
| 2,879,410 | Loeb | Mar. 24, 1959 |
| 2,890,352 | Goodrich | June 9, 1959 |
| 2,955,257 | Lindsay | Oct. 4, 1960 |

FOREIGN PATENTS

| | | |
|---|---|---|
| 150,232 | Australia | Feb. 23, 1953 |

OTHER REFERENCES

Principles of Transistor Circuits, Shea, Copyright 1953 by John Wiley & Sons, Inc., N.Y.C., pp. 169 to 179 (pp. 178, 179 relied).